United States Patent [19]

Steinbeck et al.

[11] Patent Number: 4,752,949
[45] Date of Patent: Jun. 21, 1988

[54] CORDED/CORDLESS TELEPHONE

[76] Inventors: Jay Steinbeck, 15300 San Fernando Mission Blvd., Mission Hills, Calif. 91345; Milton E. Hamilton, 626 W. Alosta, Ste. H, Glendora, Calif. 91740

[21] Appl. No.: 678,300
[22] Filed: Dec. 5, 1984
[51] Int. Cl.⁴ .............................................. H04Q 7/04
[52] U.S. Cl. ......................................... 379/61; 379/63
[58] Field of Search ................. 179/2 E, 2 EA, 2 EB; 455/33, 89; 379/61, 62; 455/58

[56] References Cited

U.S. PATENT DOCUMENTS

| | | | |
|---|---|---|---|
| 3,919,491 | 11/1975 | Luce | 179/2 A |
| 3,962,583 | 6/1976 | Linder | 379/61 |
| 3,969,673 | 7/1976 | Nordlöf | 455/89 |
| 4,206,318 | 6/1980 | Steely | 179/1 A |
| 4,535,200 | 8/1985 | Himmelbauer | 379/62 |
| 4,560,832 | 12/1988 | Bond et al. | 379/62 |
| 4,593,155 | 6/1986 | Hawkins | 379/62 |

FOREIGN PATENT DOCUMENTS 8203517  10/1982  European Pat. Off. ............. 379/61
1930531  12/1970  Fed. Rep. of Germany ........ 379/61

OTHER PUBLICATIONS

"Detachable Mobile Radio Units For The 800 MHz Land Mobile Radio System", Kobayashi et al., IEEE Venicular Technology Conference 5/84, pp. 6-11.

Primary Examiner—Robert Lev
Attorney, Agent, or Firm—Edward J. Darin

[57] ABSTRACT

A telephone capable of operation in a cordless or corded mode. The telephone is basically operative in the cordless mode through the provision of electronic transmitting and receiving elements individual to the base unit and the portable handset. The base unit and the handset are provided with conversion switching circuits coupled to be responsive to the connection of a multi-conductor cord between the base unit and the handset to convert the telephone to corded operation. The conversion circuits disable the transmitting and receiving circuits in both the base and handset and permit the telephone signals to be conductively transmitted between the units through the conductors of the cord.

9 Claims, 3 Drawing Sheets

CORDED/CORDLESS TELEPHONE

FIELD OF INVENTION

This invention relates to corded/cordless telephones and to methods for converting cordless telephones to corded telephones and vice versa.

BACKGROUND OF INVENTION

Telephones are conventioanlly constructed with a base unit which is connected to the telephone wires by a cable extending to the telephone outlet in the wall adjacent the telephone location. The base unit functions with a hand unit that is connected to the base unit by means of a cord and is not considered portable. The hand unit is restricted in its portability by the length of the cord connecting it to the base unit. The base unit may be fixed in position, or moveable within the restrictions of a telephone cable connecting it to the telephone outlet. The hand unit is usually stored on the base unit and mechanically operates a hook switch on the base unit as a result of its placement on or removal from the base unit. The operation of the hook switch controls the transmission over the telephone in accordance with its operating position. When the hand unit is mounted on the cradle of the base unit, the telephone is considered always on hook. The operation of the hook switch of the base unit by removing the hand unit from the base cradle is considered as an off hook condition and permits transmission over the telephone or permits an individual to speak into the hand unit. The placement of the hand unit back on the base unit cradle operates the hook switch for terminating transmission over the telephone. A conventional corded telephone may have the controls in either the base unit or hand unit.

In recent years cordless telephones have been manufactured and sold in large numbers. A cordless telephone also comprises a base unit and a handset, except that the handset is not connected to the base unit by a cord and may be carried a substantial distance from the base unit and still be operative therewith. Present day cordless telephones utilize electromagnetic radiation in the radio frequency range to couple the telephone signals between the base unit and the handset. For this purpose both the base unit and the handset are provided with electronic signal transmitters and electronic signal receivers that are responsive to a preselected radio frequency signal. The handset also usually contains all controls, such as a dial or buttons, to operate the cordless phone. The handset also includes a "talk" switch which must be operated when the handset is not mounted on the base unit so as to control the "off hook" condition or the ability to transmit telephone signals. When the handset is removed from the base unit, then, it is necessary to operate the talk switch to "On" to provide the "off hook" condition to allow transmission, or an individual to speak into the hand unit. When transmission is to be terminated the talk switch is operated to "Off" or the handset is placed back on the base unit so as to operate the hook switch, or to the "on hook" condition.

The cordless telephone has been found to have many problems in its use that are not found in the corded telephone. The problems that have been noted are that the cordless telephone does not have as much voice security as the conventional corded telephone, and noise can cause.a false ringing of a cordless phone, and there is a possibility that another handset for a cordless telephone operating on the same frequency can capture the base unit and make an unauthorized telephone call through a neighbor's base unit. These problems, of course, can be corrected by the use of a corded phone. The advantage of the cordless phone is that one does not have to be in the immediate vicinity of the base unit to receive a telephone call, but the phone will ring at the handset as long as it is within the transmission range of the base unit electronic transmitting means. Accordingly, there is a need for a telephone that solves the problems of a cordless phone and yet has the advantages of a corded telephone along with the advantages of a cordless telephone.

SUMMARY OF INVENTION

The present invention provides an improved, single telephone that can be used as either a corded telephone or a cordless telephone in accordance with the desires of the user. The telephone can be simply converted between the corded mode of operation and the cordless mode of operation, or vice versa, by respectively disconnecting or connecting a single cord running between the base unit and handset. The basic telephone is constructed and defined as a cordless unit so that it will operate in the conventional cordless fashion. The basic telephone includes conversion switching circuits coupling a cord connecting the base unit and the handset for converting the cordless phone to a corded unit. The single operation of placing the cord in both the base unit and the handset will remove the power from the electronic transmitters and electronic receivers in both the base unit and the handset so that the cordless mode of operation will be disabled and the phone will operate in the corded mode. As is known in the corded operation, there is no possibility of eavesdropping, unauthorized use, or false ringing. In this fashion the telephone subscriber may use a single telephone for all corded or cordless applications. In accordance with the present invention the telephone may be used as a standard corded telephone at its point of installation, and any time the user has a need for the handset to be located at a remote location the handset could be disconnected from the base and used at a distance that is within the radio frequency transmitting range of the base unit.

From a structural standpoint, the corded/cordless telephone of the present invention includes the telephone base unit that is constructed and defined to function as a cordless telephone unit. The telephone base unit is adapted to be connected to the telephone lines to receive telephone signals therefrom and to transmit telephone signals onto the telephone lines. The base unit includes conversion switching circuit means for converting the base unit to function as a corded unit. A portable telephone handset is constructed and defined to function with the base unit as a cordless telephone handset unit. The handset is adapted to be mounted to the base unit and to be portable with respect thereto. The handset includes conversion switching circuit means for converting the handset to function as a corded unit. The invention includes cord means adapted to be connected and disconnected between the conversion switching circuit means of the base unit and the handset for converting the telephone to corded operation when the cord means is connected to both the base unit and a handset, whereby the telephone signals are transmitted between the telephone units through the cord means. When the cord means is not connected the telephone functions in the cordless mode.

From a method standpoint the invention comprehends a method of converting a cordless telephone to corded operation including the steps of providing a telephone base element having electromagnetic telephone signal transmitting and receiving elements for electromagnetically transmitting telephone signals to a handset and for electromagnetically receiving telephone signals from a handset. The method also includes providing a portable handset having electromagnetic telephone signal transmitting and receiving elements for electromagnetically receiving telephone signals radiated from the base element and for electromagnetically transmitting telephone signals to the base element. The method includes the step of rendering the telephone signal transmitting elements and receiving elements in the base element and the handset inoperative, and then conductively coupling lead wires between the base element and the handset for bidirectionally transmitting the telephone signals between the base element and the handset by means of the lead wires.

BRIEF DESCRIPTION OF THE DRAWINGS

These, and other features of the present invention, may be more fully appreciated when considered in the light of the following specification and drawings in which.

DETAILED DESCRIPTION OF THE PREFERRED EMBODIMENT

Figure 1:
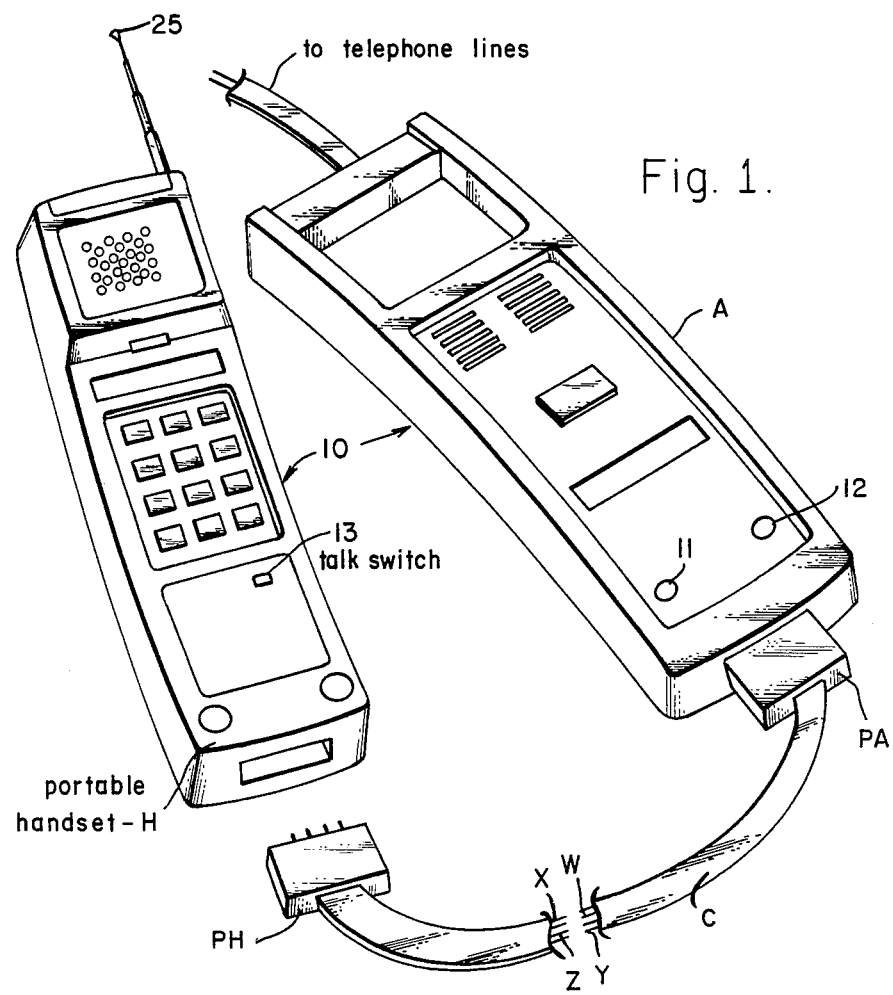
FIG. 1 is a diagrammatic representation of a telephone base unit and a telephone handset for use in both a corded or cordless mode of operation and embodying the present invention.

Now referring to the drawings, the corded/cordless telephone 10 of the present invention will be described in detail. The telephone 10 comprises a base unit A, a portable handset H, and a cord means C that is connectable and disconnectable into both the base unit A and the handset H for converting between corded and cordless operation. The base unit A and the handset H are basically constructed and defined bo operate in a cordless mode, that is, by radiating electromagnetic signals in the radio frequency range by means of receiving and transmitting units mounted in the base unit A and the handset H. The handset H is constructed to be mounted to the base unit A and control the conventional hook switch through the operation of the protrusions 11 and 12 arranged in a spaced-apart relationship on the front face of the base unit A, as illustrated in FIG. 1. As in conventional telephone units, the handset H operates the hook switches that are responsive to the depression and extension of the protrusions 11 and 12 corresponding to the placement on and removal of the handset H over the protrusions. When the hook switch is operated to a nontransmitting position as a result of the handset H depressing the protrusions 11 and 12 downwardly within the housing of the base unit A, no transmission from the telephone 10 is possible. When the handset H is removed from the protrusions 11 and 12 allowing them to move upwardly as illustrated, transmission of telephone signals along the telephone lines is possible. Since the handset H is not connected to the base unit A by means of a cord, and the handset may be at a remote location with respect to the base unit, the cordless type of handset is usually provided with a "talk" switch 13, which controls the transmission of signals from the handset H. When the talk switch 13 is in the "On" position it allows transmission, and when it is turned off, such as at the end of a telephone conversation, it prevents transmission from the hand set. The handset H is constructed and defined to continually receive signals, however, from the base element A irrespective of its location. The signals that are coupled to the base unit A are coupled by means of the telephone lines connected to the base unit and telephone signals are transmitted from the telephone 10 by the same telephone lines.

The basic mode of operation of the base unit A and the handset H, then, is the cordless mode of operation and is converted to the corded mode by plugging in the cord means C in both the base unit A and in the handset H to disable the cordless mode of operation and provide conductive paths for telephone signals between the base unit A and the handset H. The cord means C functions with conversion switching circuits provided for both the base unit A and the handset H to convert the telephone 10 from its cordless mode to the corded mode of operation. The cord means C comprises four conductive lead wires that are grouped together for effecting the corded operation. The cord means C includes conductive leads for inactivating the receivers and transmitters in both the handset and the base unit and to provide the conductive paths for coupling the telephone signals between the base unit and the handset, and from the handset to the base unit. The telephone signals may comprise analog or audio signals along with digital data signals that are multiplexed together.

Figure 3:
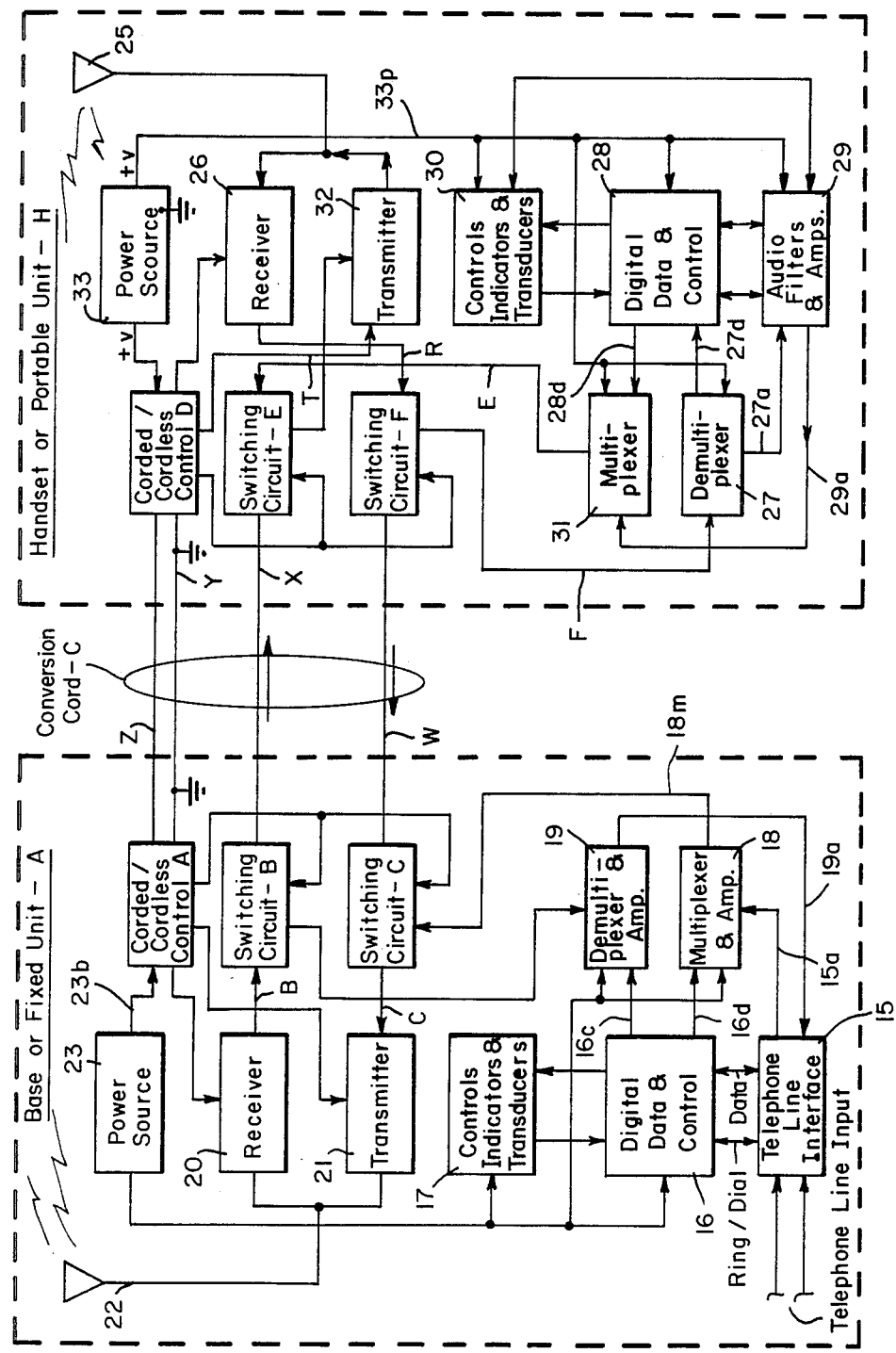
FIG. 3 is a block diagram of the elements in the base and the handset units in accordance with FIGS. 1 and 2.

Now referring to FIG. 3, the basic circuits comprising telephone 10 will be examined. As indicated hereinabove, the base unit A and the handset H are both constructed and defined to operate in a conventional fashion in the cordless mode wherein the telephone signals are transmitted between the units by electromagnetic radiation in the radio frequency range. For this purpose base unit A is connected to the telephone lines at a telephone line interface 15. The interface 15 includes the conventional equipment for receiving the signals from the telephone lines that will "ring" the telephone by means of a bell or other audible means so that the user is made aware that he is receiving a call from another telephone. Similarly, when a telephone call is to be made from the telephone 10 the telephone line interface 15 will transmit the signals representative of the telephone number of the telephone to which communication is desired along the telephone lines to "ring" the desired telephone. The telephone line interface 15 also processes the analog or audio signals and the data signals received from the telephone line input and the telephone signals to be transmitted by the telephone lines. The telephone line interface 15 is coupled to receive signals from and to transmit signals to the digital data and control element 16. The digital data and control element 16 will provide the necessary signals to the controls, indicators, and transducers element 17 as well as to the multiplexer and amplifier 18, and the demultiplexer and amplifier 19. The transducers within the element 17 will function to convert the data signals to the desired form to provide a phone "ring" signal or the digital signals representative of the telephone number of the telephone to be called along with any visual and audible control signals for illuminating lights on the base unit or providing the audible signal or "ringing". The audio signals received at the interface 15 are coupled to the multiplexing unit 18 by means of the lead wire 15A. The audio signals separated from the control data signals at the demultiplexer unit 19 are coupled to the interface 15 by means of lead wire 19A. The digital data signals are coupled to the multiplexing unit 18 from the element 16 and are coupled to the multiplexer 18 by lead wire 16D. The demultiplexer 19 also receives signals from the control element 16 by means of lead wire 16C. The multiplex element 18 combines the audio or analog signals and the digital data signals and provides them in multiplexer form on the lead wire 18M for transmission to the handset H. The demultiplexer element 19 functions to separate the analog and digital control data and provide the separated analog output signals on lead wire 19A. The base unit A also includes a radio frequency signal receiver 20 and a radio frequency signal transmitter 21. The receiver 20 and transmitter 21 are connected to the antenna 22 for receiving the RF signals transmitted from the handset H or for transmitting signals to the handset from the base unit A.

The electronic circuits represented in block form are conventionally found in a cordless phone and are powered by means of the power source 23 which is conventionally an alternating current supply. The power source 23 provides power to each of the aforementioned elements by means of the lead wires 23a and 23b. The lead wire 23b applies power to the electronic circuits under control of the corded/cordless control A, as will be explained hereinafter.

For the purpose of the present invention the base unit A includes three conversion switching circuits which are identified in FIG. 3 as the corded/cordless control A, switching circuit B, and switching circuit C. The switching circuit C is coupled to receive the signals from the multiplexer and amplifier 18 by means of lead wire 18M and to provide an output signal on line C to the transmitter 21. The switching circuit B receives the output signals from the receiver 20 by means of line B after the signals have been detected and demodulated by the receiver 20. The signals from the switching circuit B are coupled as input signals to the demultiplexer and amplifer 19 by means of lead wire O. The corded/cordless control A functions control the application of electrical power to the receiver 20 and transmitter 21 from the power source 23 and for the purposes of corded operation to disable or remove the power from the receiver 20 and transmitter 21. The circuits, then, for the base unit A, may all be of conventional construction for defining a cordless mode of operating a telephone, with the exception that the switching circuits A, B, and C are necessary for converting the base unit from cordless operation to corded operation.

The handset unit H is also similarly defined with the conventional circuits for receiving signals from the base unit A and for transmitting signals to the unit A. The signals received from the base unit A are detected by means of the antenna 25 for the hand set H and are coupled to the receiver 16. The signals processed by the receiver 26 are coupled from the receiver by means of the lead wire R. The signals outputted from the switching circuit F are coupled by means of the lead wire F to the demultiplexer 27. The signals from the demultiplexer 27 are coupled to a digital data and control unit 28 along with being coupled to the audio filters and amplifier element 29. The lead wire 27A connects the analog or audio signal to the audio filters 29 while the digital data signals are coupled to the element 28 by means of the lead wire 27D. The signals from the audio filters 29 are coupled to the element identified as the controls, indicators and transducers 30. The transducers will include a conventional microphone and speaker, and in the case of the audio signals coupled to the unit 30 from the filters 29, the audible sounds will be reproduced so that the user of the telephone 19 can hear the signals reproduced as long as the talk switch 13 is in the "On" position. Similarly, for transmitting signals, such as when the digital signals are coupled into the microphone of element 30 for the handset H, the signals are connected to the digital data and control unit 28 and from the unit 28 to the multiplexer 31 by means of lead wire 28D. The audio signals resulting from the use of the handset microphone are coupled from element 30 to the audio filters and amplifiers 29 and by means of lead wire 29A to the multiplexer 31. The output of the multiplexer 31 is applied to the switching circuit E by means of lead wire E for transmission to the base unit A. For this purpose the swtiching circuit E is coupled by means of lead wire T to the transmitter element 32. The transmitter element 32 is coupled to the hand set antenna 25 for radiating signals back to the base unit A. The circuit elements for the handset are conventionally powered by a battery source 33 having its output lead wires identified as +V. The power source 33 supplies power to the controls, indicators and transducers 30, digital data and control 28 and the audio filters and amplifiers element 29 by means of lead wire 33P. The left-hand output terminal for the power source 33 is coupled to the corded/cordless controls switching circuit D which provides power therefrom to the receiver 26, transmitter 32, and the switching circuits E and F.

It should be noted that in the cordless mode of operation for the handset H, as in the base unit A, the conversion switching circuits D, E, and F are not utilized. Briefly considering the cordless mode of operation, then, the telephone signals that are received by the telephone 10 are received at the telephone line interface 15 as an audible or ringing signal indicating that someone desires to communicate by means of the telephone. The "ring" signals are processed in elements 16 and 17 to provide the desired visual and audible signals to the subscriber. With the ringing of the telephone, the handset H is removed from the base unit A so as to permit the protrusions 11 and 12 to move upwardly to operate the hook switch to place the base in the off-hook condition and to condition the telephone for receiving signals. If the handset H is not on the base unit A, or after it is placed in the off-hook position, the talk switch 13 may be placed in the "On" position so that the telephone signals may be received at the hand set H from the base A. The received telephone signals may be the multiplexed digital data signals and the audio or analog signals. The audio signals are coupled directly to the multiplexer and amplifier 18 by means of the lead wire 15A from the telephone line interface 15 while the data signals are coupled from the digital data and control element 16 to the multiplexer 18. The multiplexer 18, than, provides the multiplexed telephone signals that are coupled to the switching circuit C by means of lead wire 18M and from circuit C by means of line C to the transmitter 21. The transmitter 21 provides the modulation for the telephone signals and couples the radio frequency modulated, multiplexed telephone signals to the antenna 22 from where they are radiated in space to the handset H. Which may be locally located or located at a remote location within the range of the base S. The maximum distance between the base element A and the handset H may be separated depends on the radiating power of the base unit A and hanset H. The signals transmitted from the antenna 22, then, are received at the handset antenna 25 and coupled to the handset receiver 26. The signals are demodulated in the receiver 26. The demodulated output signals from the receiver 26 are coupled to conversion switching circuit F and from switching circuit F to the demultiplexer 27. The demultiplexer 27 separates out the multiplexed signals and provides the audio signals to the audio filters and amplifiers 29 by means of lead wire 27A and from element 29 they are coupled to the controls, indicators and transducers 30 and wherein it is reproduced as an audible signal by the speaker (transducers) within the element 30. Similarly, the demultiplexed signals provide the data signals that are applied to digital data and control element 28. From the digital data and control 28 the signals are also coupled to the block identified by the element 30 and where the data signals may be processed or recorded.

When the telephone user wishes to transmit signals he can speak into the microphone (transducer) which is included within the block 30 and the corresponding electrical signals coupled from the speaker to the audio filters and amplifier 29. The audio signals are coupled from the element 29 into the multiplexer 31 my means of lead wire 29A to be multiplexed with any data signals. If data signals are generated at the element 30 they are coupled by means of digital data and control element 28 to the multiplexer 31 by means of lead wire 28D. The multiplexed output signals from the element 31 are coupled to the switching circuit E by lead wire E. From the switching circuit E, the multiplexed signals are coupled by means of lead wire T to the transmitter 32. The transmitter 32 couples modulated, multiplexed signals to the antenna 25 for radiation through space to the base unit A where they are detected by the antenna 22.

Figure 2:
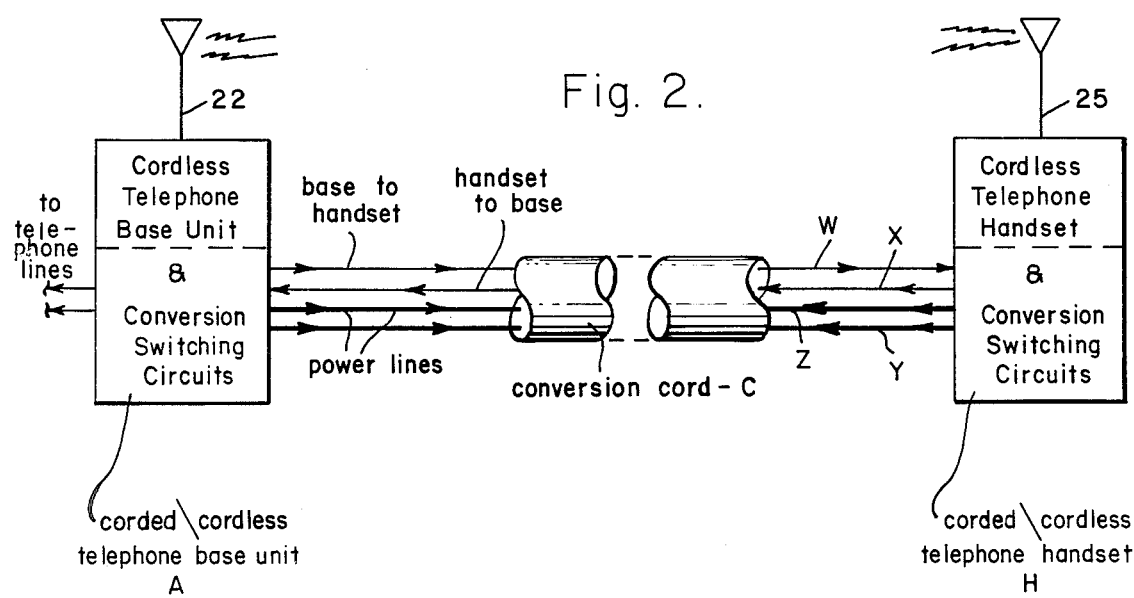
FIG. 2 is a block diagram of the base unit and the handset indicating the signal paths for both corded and cordless operation.

The conversion from the cordless mode to the corded mode of transmission is effected simply by connecting the cord means C to both the base unit A and the handset H. For this purpose the plug PA can be plugged into the side of the base unit A, as illustrated in FIG. 1, and the plug PH is plugged into the side of the handset H, as illustrated in FIG. 1. The cord means C comprises four conductive leads identified as the leads W, X, Y, and Z, for conductively coupling signals between the base unit A and the handset H. Specifically, the lead wires for the cord means C are coupled between the conversion switching circuits for the base unit A and the conversion switching circuits for the handset H. This arrangement is specifically diagrammatically indicated in FIG. 2. With respect to the lead wires labeled Z and Y towards the top of the FIG. 3, it will be noted that the lead wire Y is connected between the corded/cordless control element A for the base unit A and the corded/cordless control D for the hand set H. The lead wire Y is considered to be the ground wire which provides a common reference for the data and voltages in the handset H and the base A for the corded operation. The lead wire Z controls the application of power to the receivers and transmitters of both units. When both ends of the cord means C are plugged into the base element A and the handset H, the corded mode of operation prevails. When either end of the cord means C is disconnected, or both ends of the cord B and C are disconnected, the telephone 10 operates as a conventional, cordless telephone, as explained hereinabove. The plugging in of the plugs PA and PH into the base element A and the hand set H, respectively, is effective to remove power from the receiver 20 and transmitter 21 in the base unit A and the receiver 26 and the transmitter 32 in the hand set H. Accordingly, no signals are received or transmitted from the antennas 22 and 25. The signals that are transmitted between the base unit A and the handset H, then, are coupled by means of the lead wires labeled X and W. The lead wire X conductively couples the telephone signals from switching circuit E in the handset H to the switching circuit B in the base A. Similarly, the signals coupled by lead wire W conductively transmit the telephone signals from the base A that are conducted through the switching circuit C to switching circuit F for processing in the handset H.

Figure 4:
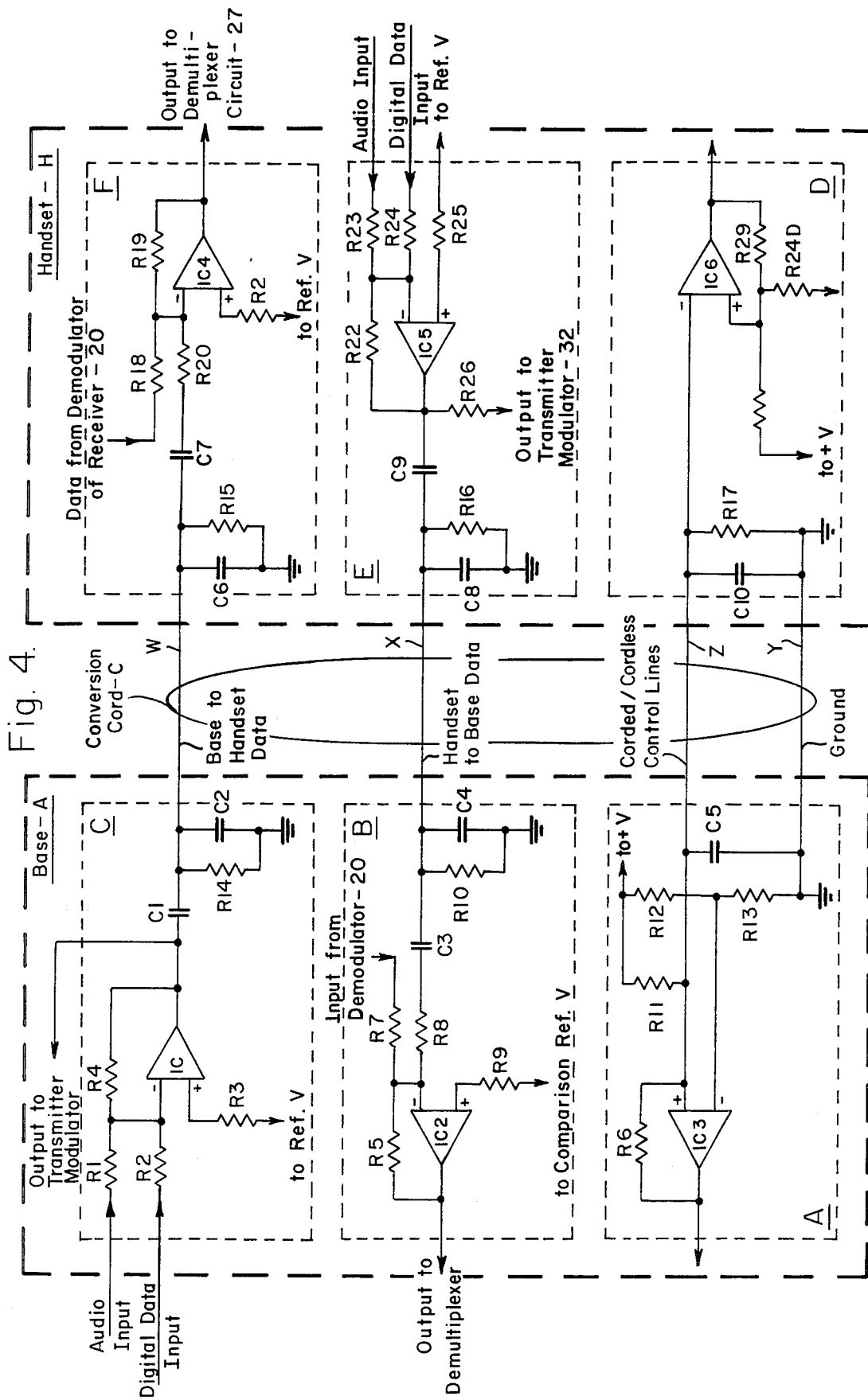
FIG. 4 is a schematic circuit diagram of the components illustrated in FIG. 3 for converting the operation between the corded and cordless modes, and vice versa, and illustrating the paths between the base unit and the handset by means of the cord means.

Now referring to FIG. 4, the detailed circuit diagrams of the switching conversions circuits A through F will be described in detail. Initially, it will be noted that the switching control circuits A and D control the application of the power to the receivers and transmitters for both the base unit A and the handset H. The lead wire Y within the cord means C is a ground lead wire and connects the circuits and the power source reference potential for the base unit A to the circuits and power source reference potential of the handset H. This lead wire Y provides a common return circuit path for all three of the other leads in the cord means C, or the leads X, W, and Z. The lead wire Z in the cord means C is the lead wire that controls the associated switching circuits for removing the electrical power from the receivers and transmitters in both the base unit A and the handset H. The switching circuit A functions with the lead wire Z by means of an operational amplifier identified as IC3. The positive input terminal of the operational amplifier IC3 is connected directly to the lead wire Z. The negative input terminal is connected to the common junction in the voltage dividing network comprising the series arranged resistors R12 and R13. One end of the resistor R13 is connected to ground or the reference potential, while the opposite end of the resistor 12 is connected to the power source, or the terminal +V. A further input resistor R11 is connected between the positive input terminal of the amplifier IC3 and the +V output terminal of the power source. A feedback resistor R6 is coupled between the output lead wire of the amplifier IC3 and the positive input of the amplifier. An RF bypass capacitor C5 is connected between the positive input terminal of the amplifier IC3 and ground to prevent excessive radio frequency radiation during operation in the cordless mode. To control the removal of power from the receiver 20 and transmitter 21, the operational amplifier IC3 is arranged with the aforementioned circuit configuration to function as a Schmitt trigger, or a voltage comparator for comparing the voltages appearing on its two input terminals and providing a corresponding output signal. The voltage comparator functions to remove power from the base receiver and transmitter when the cord means C is connected to both the base and handset.

The control switching circuit D in the handset H is similar in construction and operation to the switching circuit A. In the switching circuit D the operational amplifier IC6 is also utilized to operate as a voltage comparator, except that the circuit for the element IC3 functions as a non-inverting comparator, while the amplifier IC6 is coupled to function as an inverting comparator. For this purpose the negative input terminal of the amplifier IC6 is connected directly to the lead wire Z. The input circuit for the comparator IC6 also has an input resistor R17 coupled between the negative input terminal and ground along with an RF bypass capacitor C10. The positive input terminal of the element IC6 is connected to one terminal of resistor R27, with the other terminal being connected to the positive terminal of the lower supply +V. A feedback resistor R29 is coupled between the output circuit of the element IC6 and the positive input of IC6. The circuit also includes a resistor R24 coupled between the positive input terminal of IC6 and ground.

Considering the operation of the switching circuits A and D, for the present, when the cord means C is disconnected at either or both of its ends, then the voltage appearing at the positive input terminal of the comparator IC3 is at or near the supply voltage. At that same time the voltage appearing on the negative input terminal of IC3 is below the voltage at the positive input terminal (the actual voltage being the supply voltage times the ratio of the resistance values of resistor R13 to that of resistor R12, plus resistor R13). Whenever the voltage at the positive terminal of the comparator IC3 exceeds the voltage at the negative terminal, the output of the comparator IC3 will be positive, or a high voltage at or near the supply voltage of IC3. This will allow the receiver 20 and transmitter 21 of the base unit A to be powered for operation in the cordless mode. In the cordless mode of operation for the handset H, the negative input terminal for the comparator IC6 will be at ground potential due to the presence of the resistor R17, and the positive input terminal of the comparator IC6 will be at a more positive voltage, (which is the supply voltage times the ratio of the resistance values for the resistor R28 to resistor R27, plus resistor R28. This, then, will produce a voltage which is greater in amplitude than the voltage on the negative input terminal, and the output voltage from the comparator IC6 will be positive. This circuit operation will permit the power source to be coupled to the receiver 26 and the transmitter 32 in the handset H. This, then, will permit the telephone 10 to function in the normal mode as a cordless telephone unit. When the cord means C is connected the outputs of the comparators IC3 and IC6 will be negative, which will cause the power source to be removed from both the receivers and transmitters in both the base unit A and the hand set H and thereby preventing their operation in the cordless mode.

Specifically considering the operations of circuits A and D, when the lead wire Z is connected between the switching circuits, it will be noted that the voltage appearing at the positive input circuit of the comparator IC3 and at the negative input circuit of the comparator IC6 will be a voltage determined by the base voltage, +V, times the ratio of the resistance values of resistor R17 to resistor R11, plus resistor R17. This ratio was selected so that under the worst case conditions it is smaller than the ratio of resistance values of resistor R13 to resistor R12, plus resistor R13 in the base unit A. Under these operating conditions the voltage at the negative input of the comparator IC3 will exceed the voltage on the positive input terminal, and thereby causes the output of the comparator IC3 to be at or near ground potential. With the output of IC3 at or near ground potential, the power will be removed from the receiver 20 and transmitter 21 in the base unit. At this same time the ratio of the resistance values of resistor R17 to resistor 11, plus resistor R17, is designed to be greater than the ratio of the resistance values of resistor R28 to resistor R27 to resistor R28 so that the voltage at the negative input of the comparator IC6 exceeds the voltage at the positive input of the comparator IC6 and thereby causes its output voltage to be at or near ground potential. Under these operating conditions the voltages are removed from both the receiver 26 and transmitter 32 for the handset H. The feedback resistors R6 for the comparator IC3 and the resistor R29 for the comparator IC6 cause positive feedback to be supplied to the input circuits to insure that the circuit is switched either all the way on or all the way off at all times so a condition where it may tend to operate in both the corded and cordless modes simultaneously is not possible.

It should now be evident that, with the power removed from the receivers and transmitters of both the base unit A and the handset H, the only mode possible is the corded mode wherein the telephone signals are transmitted conductively by the lead wires W and X.

Now considering the lead wire W, which transmits the telephone signals from the base A to the handset H. The circuits illustrated in FIG. 4 for the base A is illustrated with the conversion switching circuit C connected directly to the output circuit for the multiplexer 18 in the base unit A. The multiplexer 18 comprises an operational amplifier IC1, having its output connected directly to the switching circuit C. The output signals from the multiplexing element IC1 are also coupled directly to the modulator circuit within the transmitting element 21 in the conventional fashion. With the transmitter disabled, the signals then will be conductively coupled through the conversion switching circuit C. The multiplexer 18 receives the audio input signals from the telephone line interface 15 through the series input resistor R1 directly to the negative input terminal of the amplifier IC1. The digital data input signals are coupled through the series resistor R2 to the negative input terminal of the IC1. The positive input terminal for IC1 is connected to a reference voltage source through the resistor R3. The reference voltage source is a voltage of a preselected value for comparison purposes for operating the operational amplifier IC1. A feedback resistor R4 is connected from the output circuit of the amplifer IC1 to the negative input terminal. The audio input signals and the digital data input signals in the base unit are summed together at the negative input circuit of IC1, operating as a conventional operational amplifier. The output amplitude of the audio signals from the multiplexer 18 is controlled by the ratio of the resistance values of the resistor R4 to resistor R1, while the output amplitude of the data portion of the multiplex signals is controlled by the ratio of resistance values of resistors R4 to resistor R2. With the disabling of the base transmitter 21, the output signals from the multiplexer 18 are coupled directly through the switching circuit C, the lead wire W, to the input of the conversion switching circuit F in the hand set H. The capacitor C2 within the switching circuit C for the base unit A is provided as an RF bypass capacitor to prevent radiation from the lead wire W in the event the cord means C is attached to the base unit A only during the cordless mode of operation of the telephone 10. The resistor R14 is coupled to the output circuit of the multiplexer 18 so as to terminate the lead wire W in a low impedance to prevent undesired noise pickup during the cordless mode of operation. The capacitor C1 is merely used as a DC blocking capacitor between the multiplexer output and the signal input to the switching circuit C. The multiplexer output to the transmitter modulator is thereby isolated by capacitor C1 so as to couple a signal directly through the switching circuits C. The conversion switching circuit F for the handset H is coupled to receive the signals from the lead wire W directly to the negative input terminal of the operational amplifier IC4. This signal is coupled through the input series resistor R20. A capacitor C6 is coupled to the lead wire and is utilized as an RF bypass capacitor to prevent radiation from the cord in the event the cord is attached to the hand set H during cordless operation. Similarly, the resistor R15 is connected to the input lead wire for the element IC4 to prevent undesired noise pickup during the cordless operation. The aforementioned circuit arrangement is designed so that the output impedance of the operational amplifier IC1 is much lower than the parallel combination of the resistance values of the resistors R14, R15, and R20, so that the data is present in the base unit A. The operational amplifier IC4 is provided with the two input terminals for the signals to be coupled to the switching circuit F. In addition to the telephone signals being conductively coupled directly to the negative input terminal of IC4, the signals from the demodulator of the receiver 26 for the handset H are coupled directly to the negative input terminal of IC4. Only one of these signals is effective, depending on the mode of operation. The feedback resistor R19 is connected between the negative input terminal and the output terminal of IC4. With the corded mode of operation prevailing, the signals from the transmitter demodulator are not present and therefore the conductively coupled signals on the lead wire W are effective at the amplifier IC4. The operational amplifier IC4 is provided to equalize the gain for the two modes of telephone operation. In the corded mode, the gain of element IC4 is the ratio of the resistance values of resistor R19 to resistor R20, and in the cordless mode of operation the gain is the ratio of the resistance values of resistor R19 to resistor R18. The output of operational amplifier IC4, irrespective of the mode of operation, provides the input signal to the hand set demultiplexer 27. The capacitor C7 in series with the resistor R20 and the negative input terminal is a DC blocking capacitor to prevent the possibility of damage due to improper use of the cord. The positive input terminal for the operational amplifier IC4 is connected to a reference voltage through the resistor R21. As in the operation of IC1 the reference voltage is selected for comparison purposes. The resistors R3 and R21, then, can be considered as bias offset resistors for the respective operational amplifiers IC1 and IC4. When alternating current AC input signals are utilized, the resistance value of resistor R3 will be the same resistance value as the resistor R4, and the resistance value of resistor R21 will be of the same resistance value as the resistor R19.

Now considering the lead wire X, it should be evident that the lead wire X conductively couples the telephone signals from the handset H to the base unit A when it is connected to both the conversion switching circuits B and E. As illustrated in FIG. 4, the conversion switching circuit E is shown in its relationship with the multiplexer 31 for the hand set H. Basically, the combination of the multiplexer 31 and the switching circuit E performs exactly the same function as the multiplexer 18 and the switching circuit C for the base unit. Similarly, the switching circuit B for the base unit A is the same as the switching circuit F for the hand set H. The circuit IC2 for the switching circuit B in the base unit is identical to the circuit IC4 in the switching circuit F for the handset and the circuit IC5 in the multiplexer 31 for the handset H is identical to the circuit IC1 in the multiplexer 18 for the base unit A. The absolute values of the voltages and components may change, but the gain equations and functions are identical. The circuit components function in the manner of the corresponding circuit components in circuits C and F. Briefly, then, since the receiver 26 and the transmitter 32 are disabled when the cord means C is plugged into both the base unit A and the handset H, the signal from the multiplexer 31 will be conductively coupled through the lead wire X directly to the negative input terminal for the operational amplifier IC2.

With the above structure in mind, the overall operation of the telephone 10 will now be summarized. Assuming that the cord means C is not coupled to both the base unit A and the handset H, the telephone 10 will operate in the cordless mode. In the cordless mode, the telephone signals will be coupled to the telephone line interface 15 and will be processed in a manner to transmit RF modulated mutliplexed signals from transmitter 21 to the antenna 22 in the base unit A to the antenna 2 in the handset H. The signals received at the antenna 25 will be coupled to the receiver 26 for reception and demodulation and then coupled by means of the swtiching circuit F and the lead wire F to the demultiplexe 27. The demultiplexer 27 will separate out the audio signals and the digital data signals and produce an audible signal at the transducer, or speaker, within the element 30. Similarly, if the telephone user desires to transmit a signal back to the base unit from the handset for transmission along the telephone lines, the signals are coupled to the transducer, or the microphone, within unit 30, and then coupled through the audio filters and amplifiers 29 to the multiplexer 31 and through the digital data and control element 28 to the multiplexer 31. The multiplexed signals are applied through switching circuit E to the transmitter 32 wherein they are RF modulated. The modulated, multiplexed signals, then, are radiated in space from the antenna 25 to be picked up by the antenna 22 at the base unit A. The modulated, multiplexed signals are received from the antenna 22 and are coupled to the receiver 20. The demodulated, multiplexed signals from the receiver 20 are coupled by lead wire B to switching circuit B and from the switching circuit to the demultiplexer and amplifier 19. The demultiplexer 19 separates the audio signals and the control data and applies the audio signals by means of the lead wire 19A to the telephone line interface 15 for transmission over the telephone lines. This cordless mode of operation will prevail as long as the cord means C is not coupled between both the base unit A and the handset H.

If the telephone user now wishes to have his telephone operate in the corded mode, the conversion is simply accomplished by plugging the cord means C by means of the plug PA into the base unit A, and the plug PH into the handset H. This simple operation will activate switching circuits A and D so as to remove the power from the receiver 20 and the transmitter 21 in the base unit A and the receiver 26 and transmitter 32 in the handset H. The conversion switching circuits B, C, E, and F, will also not be operative for transmitting telephone signals from the base unit A to the handset H by means of the lead wire W, as a result of the conductive paths provided between the operational amplifier IC1 in the multiplexer 18 and the operational amplifier IC4 in the switching circuit F. The output signals from the switching circuit F are applied to demultiplexer circuit 27 in the handset H and processed as they would be for the cordless mode of operation. Similarly, any signals originating at the handset H will be conductively coupled by the lead wire X through the switching circuits E and B. For this purpose the signals originating at the handset H are processed as in the cordless mode. The signals from the output of the multiplexing element IC5 are directly coupled to the negative input of the operational amplifier IC2. The signals from the element IC2 are coupled directly to the demultiplexer 19 in the base unit A and processed in the same fashion as the signals in the cordless mode.

It should now be evident that the present invention has provided a telephone unit that may be operated in the cordless mode and may be simply converted to the corded operation by the insertion of the cord means between the base unit and handset for a telephone and reconverted to the cordless operation by removing the cord means from one or both of the units.

We claim:

1. A corded/cordless telephone comprising a telephone base unit constructed and defined to function as a cordless telephone unit, the telephone base unit being adapted to be connected to the telephone lines for transmitting telephone signals thereon and to receive telephone signals therefrom, said base unit including conversion switching circuit means constructed and defined to permit a cordless telephone mode of operation and for converting the base unit to function as a corded unit in response to conversion cord means being coupled thereto; a portable telephone handset constructed and defined to function with the base unit as a cordless telephone unit, the handset being adapted to be mounted to the base unit and to be portable with respect thereto, said handset including conversion switching circuit means constructed and defined to permit a cordless telephone mode of operation and for converting the handset to function as a corded unit in response to conversion cord means being coupled thereto, and conversion cord means having a plurality of lead wires adapted to be connected and disconnected between the conversion switching circuit means of the base unit and the handset for converting the telephone to corded operation when the cord means is connected to said conversion switching circuit means of both the base unit and the handset, said connection of the cord means between both the base unit and the handset causes the conversion switching circuits to disable the cordless telephone mode of operation and to provide a circuit path by preselected individual lead wires of the cord means for conductively coupling the telephone signals whereby the telephone signals are transmitted between the base unit and the handset through said lead wires of the cord means, said cord means to be disconnected from said base unit on the handset or both to cause said telephone to function a cordless telephone.

2. A corded/cordless telephone comprising a telephone base unit and a portable telephone handset, the telephone base unit is adapted to be coupled to the telephone lines for receiving and transmitting telephone signals by means of the telephone lines, the base unit is constructed and defined to function as a cordless telephone base unit for the cordless transmission and reception of telephone signals to and from the handset, the base unit including conversion switching circuit means for transmitting telephone signals from the base unit to the handset by means of electrical conductive line means of an electrical cord means in response to an elecrical cord means having a plurality of electrically conductive lines being coupled to the conversion switching circuit means and when connected between the base unit and the handset and to receive telephone signals from the handset by means of another said electrical conductive line means, said conversion switching circuit means being responsive to the connection of a conductive line means between the base and the handset to transmit the telephone signals on preselected one of said line means and to inactivate the cordless operation of the base unit, the portable telephone handset is constructed and defined to function as a cordless telephone handset for the cordless transmission of telephone signals to and from the base unit, the handset including conversion switching circuit means for transmitting telephone signals to the base unit by means of electrical conductive line means of an electrical cord means in response to an electrical cord means having said electrical conductive lines connected between the handset and base unit, the conversion switching circuit means being responsive to the connection of said conductive line means between the base unit and the handset to transmit the telephone signals on said line means to inactivate the cordless operation of the handset, and cord means having a plurality of electrically conductive lines therein, the cord means is adapted to be connectable between and disconnectable from the conversion switching circuit means for both the base unit and the handset, the cord including conductive lines connectable between the conversion switching circuit means for the base and handset to cause the disabling of the cordless transmission of telephone signals between the base unit and the handset when the cord is connected between both of said conversion switching circuit means and to couple the telephone signals by means of the electrical conductive lines thereof coupled to the conversion switching circuit means, said cord means to be disconnected from said base unit on the handset or both to cause said telephone to function a cordless telephone.

3. A corded/cordless telephone comprising a telephone base unit adapted to be coupled to the telephone lines for receiving and transmitting telephone signals, said base unit having means for receiving signals from the telephone lines and coupling same to a telephone handset in a cordless mode of operation and means for receiving signals from a telephone handset in a cordless mode of operation and coupling same to the coupled telephone lines, said base unit including antenna means for receiving signals transmitted from a telephone handset and for transmitting signals to a telephone handset, a portable telephone handset for use with said telephone base unit, said handset having means for receiving telephone signals coupled thereto from the base unit in a cordless mode and converting them to audible signals and means for transmitting signals in a cordless mode of operation to the base unit for transmission over the telephone lines, said handset including antenna means for receiving signals transmitted from said base unit and for transmitting signals to said base unit, a cord means adapted to be connected and disconnected between the base unit and the handset to cause the disabling of the cordless mode of operation and the corded/cordless telephone to function as a corded telephone and to be disconnected from the base unit or the handset or both to cause said telephone to function as a cordless telephone, said base unit and said handset each including individual conversion switching circuit means coupled to be responsive to the cord means being connected between both the base unit and the handset to disable the cordless mode of operation and cause the telephone signals to be conductively coupled between the base unit and the handset through the cord means and to be responsive to the cord means being disconnected from at least the base unit or the handset to cause the telephone signals to be coupled between the base unit and the handset by transmission between the antenna means in a cordless mode.

4. A corded/cordless telephone comprising a telephone base unit and a portable telephone handset, said telephone base unit is adapted to be coupled to the telephone lines for receiving and transmitting telephone signals by means of the telephone lines, said base unit including means constructed and defined to function as a cordless telephone unit, said base unit means including antenna means for the transmission of telephone signals to the handset and the receive telephone signals from the handset; an electronic signal transmitting means coupled to the antenna means for coupling telephone signals to the antenna means to be transmitted to the handset; and electronic signal receiving means coupled to the antenna means for receiving telephone signals transmitted from the handset, said portable telephone handset including means constructed and defined to function as a cordless telephone unit with said base unit, said handset including antenna means for the reception of telephone signals transmitted from the base unit and to transmit telephone signals to the base unit; an electronic signal receiving means coupled to said antenna means for receiving the telephone signals transmitted from said base unit; and electronic transmittng means coupled to said antenna means for coupling telephone signals to the antenna means to be transmitted to the base unit, individual conversion switching circuit means for the base unit and the handset for converting the base and handset from cordless to corded telephone operation when cord means is coupled between both the base unit and the handset, the individual conversion switching circuit means being constructed and defined to be responsive to the interconnection of the base unit and handset by cord means to disable the signal receiving and transmitting means for both the base unit and the handset, and cord means having a plurality of lead wires adapted to be connected and disconnected between the base unit and the handset circuit means including a lead wire connected to the individual conversion switching circuit means for the base and handset, and a preselected plurality of the lead wires of the cord means are coupled between the base unit ad the handset for transmitting the telephone signals between the units by means of individual lead wires, said lead wires for the cord means including a lead wire functioning with said individual conversion circuit means for the base and handset when connected therebetween to disable said signal receiving and transmitting means whereby the telephone signals are coupled between the base and handset by said individual lead wires only when the cord means is interconnected between said individual conversion switching circuit means for both the base unit and handset, said cord means to be disconnected from said base unit on the handset or both to cause said telephone to function a cordless telephone.

5. A corded/cordless telephone comprising a telephone base unit and a portable telephone handset, said telephone base unit is adapted to be coupled to the telephone lines for receiving and transmitting telephone signals by means of the telephone lines and including means constructed and defined to function as a cordless telephone base unit, said base unit means including antenna means for the transmission of telephone signals to the handset and to receive telephone signals from the handset; an electronic signal transmitting means coupled to the antenna means for coupling telephone signals to the antenna means to be transmitted to the handset; and electronic signal receiving means coupled to the antenna means for receiving telephone signals transmitted from the handset, said portable telephone handset including means constructed and defined to function as a cordless telephone unit with said base unit, said handset including antenna means for the reception of telephone signals transmitted from the base unit and to transmit telephone signals to the base unit; an electronic signal receiving means coupled to said antenna means for receiving the telephone signals transmitted from said base; an electronic transmitting means coupled to said antenna means for coupling telephone signals to the antenna means to be transmitted to the base unit, individual conversion switching circuit means for the base unit and the handset for converting the base and handset from cordless to corded telephone operation when cord means is coupled between both the base unit and the handset, the individual conversion switching circuit means being constructed and defined to be responsive to the interconnection of the base and handset by the cord means to remove power from the signal receiving and transmitting means for both the base unit and the and cord means having a plurality of lead wires adapted to be connected between the individual conversion switching circuit means for the base and handset and to transmit the telephone signals between same by means of individual lead wires when connected to each of the individual conversion circuit means, said lead wires including lead wires functioning with said individual conversion circuit means for the base and handset to remove power from said signal receiving and transmitting means whereby the telephone signals are coupled between the base and handset by said individual lead wires only when the cord means is interconnected between said individual conversion switching circuit means for the base unit and handset, said individual conversion switching circuit means for the base unit and handset comprises a first conversion switching circuit means for the base unit adapted to be coupled to an electrical power source for powering the base unit and coupling the electrical power source to said transmitting means and said receiving means to power said means, said first conversion circuit means having voltage comparison circuit means having first and second inputs for comparing the voltage signals coupled thereto, first and second input circuit means being adapted to be coupled to the electrical power source for the base unit and individually coupled to the first and second inputs for the comparison circuit means, said first and second input circuit means being arranged to proportion the voltages provided to the first and second inputs in the absence of the cord means to provide an output voltage sufficient to power said transmittng means and said receiving means, a second conversion switching circuit means for the handset adapted to be coupled to an electrical power source for powering the handset and coupling the electrical power source to said transmitting means and receiving means for the handset, said second conversion circuit means having a second voltage comparison circuit means having first and second inputs for comparing the voltage signals coupled thereto, first and second input circuit means being adapted to be coupled to the electrical power source for the handset and individually coupled to the first and second inputs for the second conversion circuit means, said first and second input circuit means being arranged to proportion the voltages provided to the first and second inputs for the second voltage comparison circuit means in the absence of the cord means to provide an output voltage sufficient to power said transmitting means and said receiving means for the handset, said first and second input circuit means for each of said first and second comparison circuit means being proportioned to be responsive to the connection of cord means between said first and second conversion switching circuit means for the base unit and the handset whereby the cord means provides a conductive circuit path between a preselected one of the inputs for the first and second voltage comparison circuit means to cause the voltage signals coupled to the first and second inputs to both the first and second comparison circuits to be modified to cause the output signals from each of the second comparison circuits to have output voltages insufficient to power the transmitting means and the receiving means for both the base unit and the handset.

6. A corded/cordless telephone as defined in claim 5 wherein said base unit includes multiplexing circuit means coupled to receive the telephone signals received by the base unit over the telephone lines and providing multiplexed output signals representative of the telephone signals, said multiplexed output signals being coupled to the transmitting means for said base unit to transmit the multiplexed signals to the handset, said base unit conversion switching circuit means including a signal transmitting circuit means coupled to receive the multiplexed output signals of said multiplexing circuit means for conductively transmitting the output signals only when said cord means is connected between the base unit and the handset, said handset conversion switching circuit means including signal transmitting circuit means coupled to receive the multiplexed output signals transmitted by the transmitting means for the base unit and the multiplexed output signals conductively transmitted through said cord means only when the cord means is connected between the signal transmitting circuit means for the base unit and the handset, said signal transmitting circuit means providing the received multiplexed output signals in accordance with the corded or cordless mode of telephone operation, said handset including de-multiplexing circuit means coupled to receive the output signal from said signal transmitting circuit means for the handset, said de-multiplexing circuit means providing individual output signals comprising the multiplexed transmitted telephone signals, and circuit means in the handset for processing the individual signals including providing an audible output signal, said handset including multiplexing circuit means for receiving telephone signals including analog signals to be transmitted to the base unit and providing multiplexed output signals therefrom, said handset including a second signal transmitting circuit means coupled to receive the output signals from said multiplexing circuit means and to conductively connect said output signals to a connected cord means, the output signals from said multiplexing circuit being coupled to said transmitting means for the handset, said base unit including a second signal transmitting circuit means to conductively receive the output signals from said multiplexing circuit means for the handset by means of the cord means only when the cord means is connected between said second signal transmitting circuit means for both the base unit and the handset, said base unit further including demultiplexing circuit means coupled to receive the signals from said second signal transmitting circuit means for the base unit and providing output signals representative of the individual multiplexed telephone signals, and circuit means in the base unit for processing the individual signals and providing a telephone signal to be transmitted over the telephone lines.

7. A corded/cordless telephone as defined in claim 3 wherein said cord means comprises at least four conductive lead wires.

8. A corded/cordless telephone as defined in claim 7 wherein one of the conductive lead lines is utilized as a means of providing a common voltage reference for both the telephone base unit and the handset.

9. A corded/cordless telephone comprising a telephone base unit and a portable telephone handset, said telephone base unit is adapted to be coupled to the telephone lines for receiving and transmitting telephone signals by means of the telephone lines, said base unit including means constructed and defined to function as a cordless telephone unit, said base unit means including antenna means for the transmission of telephone signals to the handset and to receive telephone signals from the handset; an electronic signal transmitting means coupled to the antenna means for coupling telephone signals to the antenna means to be transmitted to the handset; and electronic signal receiving means coupled to the antenna means for receiving telephone signals transmitted from the handset, said portable telephone handset including means constructed and defined to function as a cordless telephone unit with said base unit, said handset including antenna means for the reception of telephone signals transmitted from the base unit and to transmit telephone signals to the base unit, an electronic signal receiving means coupled to said antenna means for receiving the telephone signals transmitted from said base unit; an electronic transmitting means coupled to said antenna means for coupling telephone signals to the antenna means to be transmitted to the base unit, individual conversion switching circuit means for the base unit and the handset for converting the base and handset from cordless to corded telephone operation when cord means is coupled between both the base unit and the handset, the individual conversion switching circuit means being constructed and defined to be responsive to the interconnection of the base unit and handset by cord means to disable the signal receiving and transmitting means for both the base unit and the handset, cord means having a plurality of lead wires adapted to be connected and disconnected between the base unit and the handset circuit means including a lead wire connnected to the individual conversion switching circuit means for base and handset, and a preselected plurality of the lead wires of the cord means are coupled between the base unit and handset for transmitting the telephone signals between the units by means of individual lead wires, said lead wires for the cord means including a lead wire functioning with said individual conversion circuit means for the base and handset when connected therebetween to disable said signal receiving and transmitting means whereby the telephone signals are coupled between the base and handset by said individual lead wires only when the cord means is interconnected between said individual conversion switching circuit means for both the base unit and handset, wherein said base unit includes multiplexing circuit means coupled to receive the telephone signals received by the base unit over the telephone lines and providing multiplexed output signals representative of the telephone signals, said multiplexed output signals being coupled to the transmitting means for said base unit to transmit the multiplexed signals to the handset, said base unit conversion switching circuit means including a signal transmitting circuit means coupled to receive the multiplexed output signals of said multiplexing circuit means for conductively transmitting the output signals only when said cord means is connected between the base unit and the handset, said handset conversion switching circuit means including signal transmitting circuit means coupled to receive the multiplexed output signals transmitted by the transmitting means for the base unit and the multiplexed output signals conductively transmitted through said cord means only when the cord means is connected between the signal transmitting circuit means for the base unit and the handset, said signal transmitting circuit means providing the received multiplexed output signals in accordance with the corded or cordless mode of telephone operation, said handset including de-multiplexing circuit means coupled to receive the output signals from said signal transmitting circuit means for the handset, said de-multiplexing circuit means providing individual output signals comprising the multiplexed transmitted telephone signals, and circuit means in the handset for processing the individual signals including providing an audible output signal, said handset including multiplexing circuit means for receiving telephone signals including analog signal to be transmitted to the base unit and providing multiplexed output signals therefrom, said handset including a second signal transmitting circuit means coupled to receive the output signals from said multiplexing circuit means and to conductively connect said output signals to a connected cord means, the output signals from said multiplexing circuit being coupled to said transmitting means for the handset, said base unit including a second signal transmitting circuit means to conductively receive the output signals from said multiplexing circuit means for the handset by means of the cord means only when the cord means is connected between said second signal transmitting circuit means for both the base unit and the handset, said base unit further including demultiplexing circuit means coupled to receive the signals from said second signal transmitting circuit means for the base unit and providing output signals representative of the individual multiplexed telephone signals, and circuit means in the base unit for processing the individual signal and providing a telephone signal to be transmitted over the telephone lines, said cord means to be disconnected from said base unit on the handset or both to cause said telephone to function a cordless telephone.

* * * * *

UNITED STATES PATENT AND TRADEMARK OFFICE
CERTIFICATE OF CORRECTION

PATENT NO. : 4,752,949

DATED : June 21, 1988

INVENTOR(S) : Jay Steinbeck et al.

It is certified that error appears in the above-identified patent and that said Letters Patent is hereby corrected as shown below:

On first page of patent, under [56], column 2 (last line of [56], just before "ABSTRACT", Attorney, Agent, or Firm should be -- Edward J. DaRin --.

Column 3, line 54, "bo" should be -- to --.
Column 5, line 67, "16" should be -- 26 --.
Column 6, line 7, "signal" should be -- signals --;
        line 18, after "digital" and before "signals", insert -- data --.
Column 7, line 7, "H.  Which" should be -- H, which --;
        line 8, "S" should be -- A --;
        line 22, after "30", delete "and";
        line 35, "my" should be -- by --.
Column 9, line 16, "lower" should be -- power --.
Column 12, line 35, "demultiplexe" should be -- demultiplexer --.

Column 14, line 11, "elecrical" should be -- electrical --;
        line 15, after "another", insert -- of --;
        line 19, "one" should be -- ones --;

UNITED STATES PATENT AND TRADEMARK OFFICE
CERTIFICATE OF CORRECTION

PATENT NO. : 4,752,949

DATED : June 21, 1988

INVENTOR(S) : Jay Steinbeck et al.

it is certified that error appears in the above-identified patent and that said Letters Patent is hereby corrected as shown below:

Column 15, line 28, "the" (second occurrence) should be -- to --;
         line 60, "ad" should be -- and --.

Column 17, line 60, "signal" should be -- signals --.
Column 20, line 9, "signal" should be -- signals --;

Signed and Sealed this

Twelfth Day of September, 1989

Attest:

DONALD J. QUIGG

Attesting Officer

Commissioner of Patents and Trademarks